(12) United States Patent
Simon

(10) Patent No.: US 7,208,909 B2
(45) Date of Patent: Apr. 24, 2007

(54) MOTOR PROTECTION INHIBIT CIRCUIT

(75) Inventor: Jeffrey J. Simon, Germantown, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 66 days.

(21) Appl. No.: 11/192,650

(22) Filed: Jul. 29, 2005

(65) Prior Publication Data

US 2007/0035897 A1    Feb. 15, 2007

(51) Int. Cl.
*H02P 1/26*    (2006.01)

(52) U.S. Cl. .................. 318/778; 318/430; 318/434; 388/903

(58) Field of Classification Search ........ 318/430–434, 318/445, 484, 727, 766, 778; 388/903
See application file for complete search history.

(56) References Cited

U.S. PATENT DOCUMENTS

| | | | | |
|---|---|---|---|---|
| 4,636,702 A | * | 1/1987 | Hedges | ...................... 318/729 |
| 4,670,697 A | * | 6/1987 | Wrege et al. | ................ 318/786 |
| 4,751,450 A | * | 6/1988 | Lorenz et al. | ............... 318/786 |
| 4,782,278 A | * | 11/1988 | Bossi et al. | .................. 318/786 |
| 4,800,326 A | * | 1/1989 | Unsworth | .................... 318/729 |
| 5,436,784 A | | 7/1995 | Schweitzer, III et al. | |
| 5,719,732 A | * | 2/1998 | Nagahama et al. | ............ 361/29 |

* cited by examiner

*Primary Examiner*—Bentsu Ro
(74) *Attorney, Agent, or Firm*—Keith M. Baxter; Alexander M. Gerasimow

(57) ABSTRACT

A circuit for inhibiting a protection device of a motor includes first, second, and third comparators and an inhibit signal generator. The first comparator is operable to determine if a motor current signal associated with the motor exceeds a starting threshold to identify a starting state of the motor. The second comparator is operable to determine if the motor current signal exceeds an inrush threshold to identify a transition from the starting state to an inrush state of the motor. The third comparator is operable to determine if the motor current signal falls below a running threshold to identify a transition from the inrush state to a running state of the motor. The inhibit signal generator is operable to deassert an inhibit signal for inhibiting the protection device responsive to the third comparator identifying the running state.

19 Claims, 4 Drawing Sheets

MOTOR PROTECTION INHIBIT CIRCUIT

CROSS-REFERENCE TO RELATED APPLICATIONS

Not applicable.

STATEMENT REGARDING FEDERALLY SPONSORED RESEARCH OR DEVELOPMENT

Not applicable

BACKGROUND OF THE INVENTION

The present invention relates generally to motion control systems, and, more particularly, to a circuit for inhibiting motor protection during motor start-up.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art.

Induction motors have broad application in industry. An induction motor system typically includes a drive or controller, a motor overload protection device, and an induction motor. The controller may be as simple as an electromechanical starter (i.e., contactor) that simply links the supply lines to the motor terminals through switching contacts without affecting the supply power waveform, or may include a power conversion configuration that generally receives power via supply lines and converts the received power into a form that can be provided to the motor thereby causing a motor rotor to rotate at variable speeds or reduced power. The conversion configuration typically includes a plurality of semiconductor switching devices that link the supply lines to motor terminals and, based on switch turn on and turn off cycles, provide power to the motor phases linked thereto. The motor overload protection device may be required by local electric codes to provide minimal protection against the motor overheating due to an extended period of excess load current from conditions such as locked rotor or excessive motor loading which could lead to a fire.

Typically, a motor system includes at least motor protection circuitry that senses a motor overload condition due to a locked rotor condition or excessive load and interrupts current to the motor to prevent overheating, which could damage the equipment or endanger personnel. Generally, the protection circuitry senses the level of current versus time to determine when to interrupt the current to the motor. Often, motors may have additional protection circuitry that senses a locked rotor or jammed condition of the motor and shuts down the motor to prevent overheating, which could damage the equipment or endanger personnel. Generally, the jam protection circuitry senses the level of the current as compared to the full load amp rating (FLA) of the motor and shuts down the motor if the measured current exceeds the FLA by a predetermined amount (e.g., 400% FLA). The predetermined threshold is commonly referred to as the jam current.

During motor startup, the current required to start the rotation of the motor, commonly referred to as the inrush current, is typically much higher than the FLA rating. For example, the peak inrush current may be from 400% to 1000% of the FLA. For a typical motor, the peak inrush current may be about 600% of the FLA. The duration of the inrush current may vary widely, e.g., from 1 second to 30 seconds.

If the motor protection circuitry is always active, the motor may trip due to the inrush current, if the inrush current exceeds the jam current. One solution for addressing the inrush current interval is to disable the protection circuitry during motor startup to avoid inadvertent motor trips. Typically a startup timer is employed to inhibit the motor protection circuitry for a predetermined time interval, such as 30 seconds, after a motor startup. The inhibit timer begins when motor current is sensed or when a contactor feeding the motor is energized. The timer interval is set to a value that conservatively exceeds the inrush current. The timer may be integrated into a protection device or may be an external device that is wired into the protection circuit.

One limitation of the startup solution is that protection may be inhibited for an unnecessarily long time. During the time interval after the inrush current subsides, but before the inhibit timer elapses, a fault condition may arise that is not addressed immediately.

Another technique for providing motor protection involves employing a microprocessor based protection device that monitors the inrush current profile and inhibits the motor protection using a firmware algorithm. The microprocessor/firmware protection device increases the cost and complexity of the drive system and protection circuitry.

The present invention is directed to overcoming, or at least reducing the effects of, one or more of the problems set forth above.

BRIEF SUMMARY OF THE INVENTION

The present inventors have recognized that an inhibit circuit employing comparators may be used to dynamically detect the startup cycle of a motor and inhibit motor protection during the startup to avoid inadvertent trips. Moreover, by detecting the actual startup and enabling protection, as opposed to waiting a predetermined time interval, motor protection may be enabled sooner, thereby reducing the time required to detect a motor fault condition occurring soon after the startup.

One aspect of the present invention is seen in a circuit for inhibiting a protection device of a motor. The circuit includes first, second, and third comparators and an inhibit signal generator. The first comparator is operable to determine if a motor current signal associated with the motor exceeds a starting threshold to identify a starting state of the motor. The second comparator is operable to determine if the motor current signal exceeds an inrush threshold to identify a transition from the starting state to an inrush state of the motor. The third comparator is operable to determine if the motor current signal falls below a running threshold to identify a transition from the inrush state to a running state of the motor. The inhibit signal generator is operable to deassert an inhibit signal for inhibiting the protection device responsive to the third comparator identifying the running state.

Another aspect of the present invention is seen in a motor control system including a motor, a controller, a protection device, and an inhibit circuit. The motor operable is to rotate responsive to a motor drive signal. The controller is operable to provide the motor drive signal to the motor. The protection device is operable to monitor a motor current signal associated with the motor to perform a protective function for the motor. The inhibit circuit includes a starting comparator, an inrush comparator, and a running comparator.

The starting comparator is operable to compare the motor current signal to a starting threshold and assert a starting output signal responsive to the motor current signal exceeding the starting threshold. The inrush comparator is operable to compare the motor current signal to an inrush threshold and assert an inrush output signal responsive to the motor current signal exceeding the inrush threshold after exceeding the starting threshold. The running comparator is operable to compare the motor current signal to a running threshold and assert a running output signal responsive to the motor current signal falling below the running threshold after exceeding the inrush threshold. The inhibit signal generator is operable to deassert an inhibit signal for inhibiting the protection device responsive to the assertion of the running output signal.

These and other objects, advantages and aspects of the invention will become apparent from the following description. The particular objects and advantages described herein may apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Figure 1:
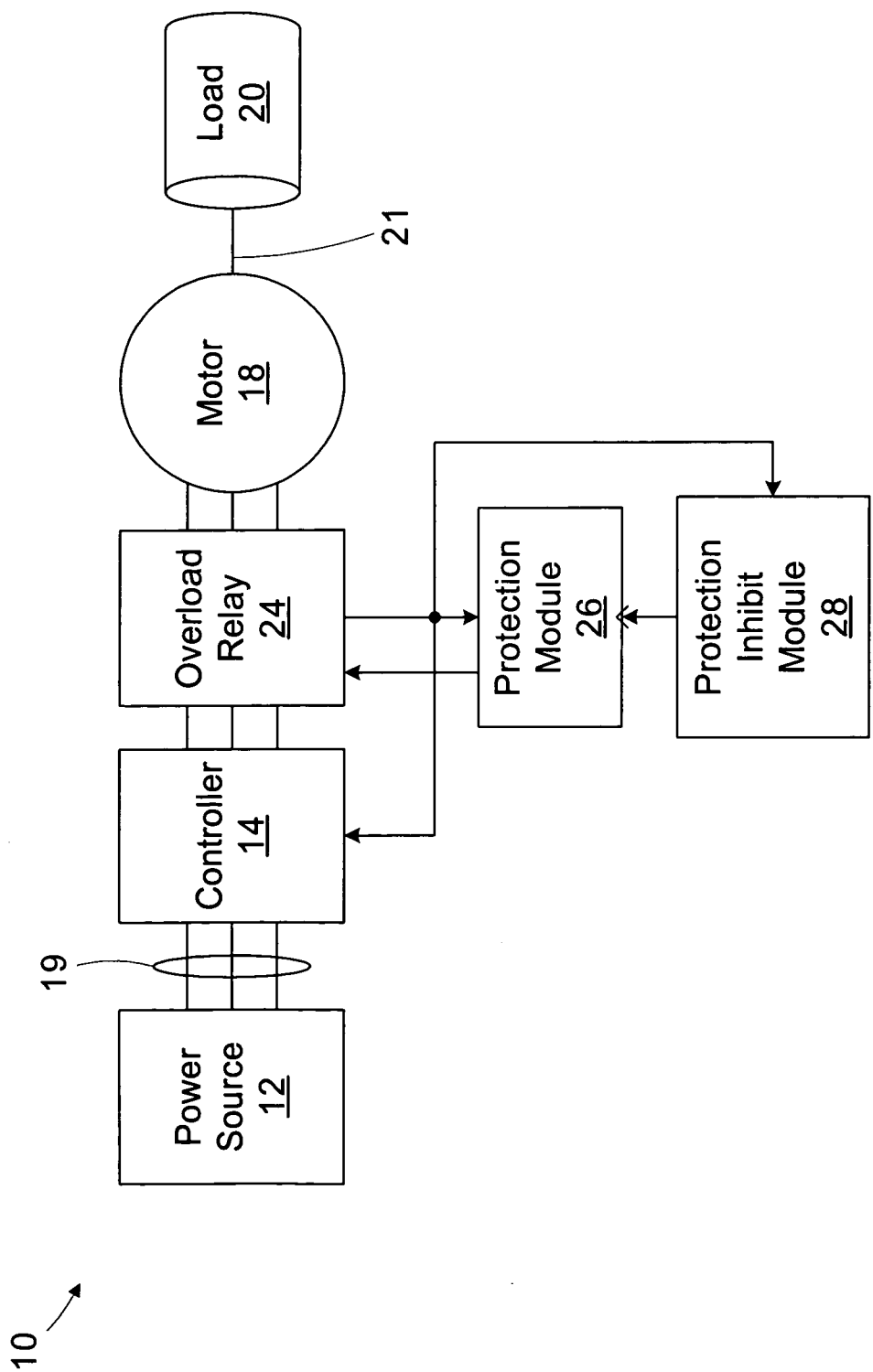
FIG. 1 is a simplified diagram of a motor control system in accordance with one embodiment of the present invention.

Referring now to the drawings wherein like reference numbers correspond to similar components throughout the several views and, specifically, referring to FIG. 1, the present invention shall be described in the context of an exemplary motor control system 10. The motor control system 10 includes a power source 12, a controller 14, a three-phase motor 18, a load 20, an overload relay 24, a protection module 26, a protection inhibit module 28, and a plurality of lines and buses that link the aforementioned components together in the manner described hereinafter.

The power source 12 typically provides a three phase AC voltage received from a utility grid. The nominal line voltage of the power source 12 may vary depending on the particular implementation. The controller 14 may be a simple contactor operable to connect the motor 18 to the power source 12, or a more complicated motor drive unit used in conjunction with or in place of a contactor. In general, a motor drive unit includes rectifying circuitry that receives 3-phase power from the power source 12 and converts the AC power to DC and inverter circuitry positioned between positive and negative DC buses of the rectifying circuitry to generate motor drive signals. As is well known in the motor controls industry, a motor drive unit includes a plurality of switching devices (e.g., BJT's, etc.) that are positioned between the positive and negative DC buses and supply lines such that by opening and closing specific combinations of the inverter switches, positive and negative DC voltage pulses are generated on each of the supply lines. By opening and closing the inverter switches in specific sequences, AC voltages having controllable amplitudes and frequencies can be generated on each of the supply lines. For purposes of the following illustration it is assumed that the controller 14 is a contactor that connects or isolates the motor 18 and power source 12 responsive to a start/stop control signal.

Each of the lines 19 is linked to a separate one of three-phase windings (not separately numbered or illustrated) of the motor 18 through the controller 14 and the overload relay 24. A motor rotor (not illustrated) which is linked to a motor shaft 21 resides within the motor core. The rotor includes either bars or windings or both and, when the changing and rotating magnetic field within the stator core intersects the rotor, currents are induced within the rotor and the rotor currents in turn cause a rotor magnetic field within the stator core. The rotor field is attracted by the rotating stator field and hence the rotor rotates within the stator core. The load 20 is attached via shaft 21 to the rotor and therefore, when the rotor rotates, load 20 also tends to rotate in the same direction.

The overload relay 24 directly monitors the current on the supply lines 19 to the motor 18 to provide thermal protection for the motor 18. A Bulletin 193 E1 Plus Solid-State Overload Relay, offered by Rockwell Automation, Inc. of Milwaukee, Wis. is one example of an overload relay that may be used. In the illustrated embodiment, the overload relay 24 generates a motor current signal indicating the motor current as a proportion of the FLA rating of the motor (e.g., 100%=FLA current). If the overload relay 24 detects a thermal overload condition, it interrupts control power to the controller 14, thereby disconnecting the motor 18 from the supply lines 19 and preventing its further operation.

The protection module 26 receives the current signal generated by the overload relay 24 to identify a jam condition of the motor during operation. If the motor current exceeds a predetermined threshold (e.g., 400%), the protection module 26 shuts down the motor 18 by sending a signal to the overload relay 24 to interrupt the controller 14. A device suitable for use as the protection module 26 is a model 193-EJM Jam Module also offered by Rockwell Automation, Inc.

The protection inhibit module 28 interfaces with the protection module 26 to disable its protective function (e.g., jam detection) during motor startup, as will be described in greater detail below. Although the protection module 26 and protection inhibit module 28 are illustrated as separate entities, it is contemplated that the protection inhibit module 28 may be integrated with the protection module 26 in a single package, such as a side mount configuration. Also, it is not required that the protection inhibit module 28 receive the motor current signal from the overload relay 24. The protection inhibit module 28 may have its own sensor for measuring motor current, or it may receive the motor current signal directly or indirectly from a different source.

Figure 2:
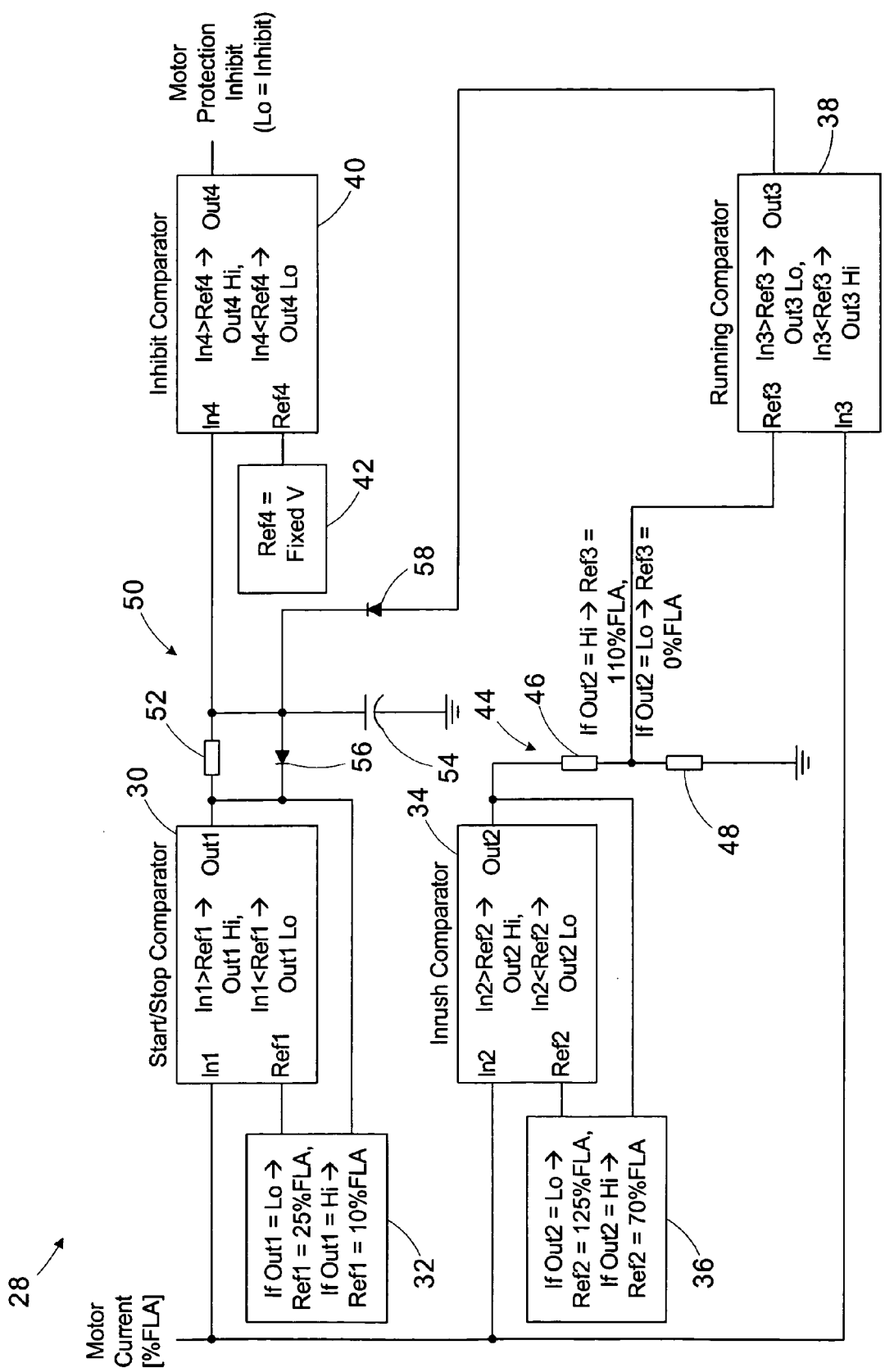
FIG. 2 is a simplified block diagram of a protection inhibit circuit in the motor control system of FIG. 1.

Turning now to FIG. 2, a simplified circuit diagram of the protection inhibit module 28 is shown. The protection inhibit module 28 includes a start/stop comparator 30 with an associated reference generator 32, an inrush comparator 34 with an associated reference generator 36, a running comparator 38, and an inhibit comparator 40 with an associated reference generator 42. A voltage divider 44, including resistors 46 and 48, provides a reference signal for the running comparator 38. A delay circuit 50 includes a resistor 52, a capacitor 54, a discharge diode 56, and a charging diode 58. The protection inhibit module 28 is implemented using analog circuitry. Initially, the output values of the comparators 30, 34, 38, 40 are all low representing a stopped state of the protection inhibit module 28. Because the output of the inhibit comparator 40 is low, the protection module 26 is inhibited.

As seen in FIG. 2, the reference generator 32 monitors the output of the start/stop comparator 30 and changes its reference signal based thereon. The reference generator 36 performs a similar reference adjustment based on the output of the inrush comparator 34. The "hysteresis" provided by the reference generators 32, 36 is added to prevent the associated comparators 30, 34 from rapidly switching between states if noise is present in the signal, and may or may not be preesnet in all applications of the present invention. For ease of illustration and to avoid obscuring the instant invention, the circuit components for implementing the reference generators are not shown in detail. Those of ordinary skill in the art are capable of selecting and arranging the particular resistors, capacitors, transistors, and amplifiers to generate the appropriate reference signals and comparisons described herein. For instance, a reference generator may be implemented using a voltage divider that scales an input voltage to a value corresponding to a particular motor current. A transistor may be used to gate in an additional resistor to change the ratio of the voltage divider, thereby changing the reference voltage to correspond to a different motor current when its gate is activated by the output of the associated comparator 30, 34.

Referring to FIGS. 1 and 2, in a stopped mode of operation, the controller 14 is in an open state and drive signals are not provided to the motor 18. After a start signal is received, the controller 14 closes and current begins to flow. The start/stop comparator 30 detects the start of the motor 18 by comparing the motor current signal to a first threshold of 25% FLA provided by the reference generator 32. When the 25% FLA threshold is reached, the output of the start/stop comparator 30 transitions to a high state indicating the starting state of the motor 18. When the output of the start/stop comparator 30 goes high, the delay circuit 50 begins to charge. In the illustrated embodiment, the resistor 52 and capacitor 54 are sized such that the delay provided by the delay circuit 50 is approximately 30 seconds. Of course, other delay times or FLA % thresholds may be used depending on the particular implementation.

When the output of the start/stop comparator 30 goes high, the reference generator 32 changes its reference signal to 10% FLA. If the motor current were to fall below the 10% FLA threshold, indicating stoppage of the motor 18, the start/stop comparator 30 output would return to a low state indicating the stopped state of the motor 18. When the output of the start/stop comparator 30 is low, the capacitor 54 quickly discharges through the discharge diode 56, thereby resetting the delay circuit 50.

The inrush comparator 34 detects the inrush current of the motor 18 by comparing the motor current signal to a first threshold of 125% FLA provided by the reference generator 36. When the 125% FLA threshold is reached, the output of the inrush comparator 34 transitions to a high state indicating the detection of the inrush current. When the output of the inrush comparator 34 goes high, the reference generator 36 changes its reference signal to 70% FLA.

The output of the inrush comparator 34 is scaled by the voltage divider 44 such that, when it is high, the output of the voltage divider 44 corresponds to a value of 110% FLA. The voltage divider 44 provides the reference signal for the running comparator 38. The motor 18 is determined to be in a running state after the motor current exceeds the 125% FLA inrush threshold as detected by the inrush comparator 34, and then drops back down below the 110% FLA threshold, as detected by the running comparator 38. When the running comparator 38 detects the transition back below 110% FLA, its output goes high indicating the running state.

The inhibit comparator 40 compares the voltage on the capacitor 54 to a fixed threshold, and removes the inhibit signal from the protection module 26 when the capacitor voltage exceeds the fixed threshold. The fixed threshold corresponds to the voltage that would be present on the capacitor 54 after 30 seconds of charging of the delay circuit 50 by the start/stop comparator 30 without the activation of the running comparator 38. When the running comparator 38 output goes high, the running comparator 38 quickly charges the capacitor 54 through the charging diode 58, thereby bypassing the delay.

Hence, the inhibit signal can be removed from the protection module 26 in one of two ways, either by the detection of the inrush current spike and the subsequent return to a running current level by the inrush comparator 34 and the running comparator 38 or by the elapsing of the time interval set by the delay circuit 50. The delay circuit 50 provides a maximum time interval for which the protection module 26 will be inhibited. For instance, if the motor current does not exceed 125% during the inrush, or the motor current does not drop back down to 110% prior to the 30 second time interval, the protection module 26 will be enabled. Hence, if the protection inhibit module 28 fails to identify the startup cycle, the delay circuit 50 will elapse, and the protection module 26 will still be enabled to provide protection for the motor.

Once a running state has been achieved, the state is maintained until the motor current begins to drop. When the motor current drops below 70% FLA, the output of the inrush comparator 34 goes low, generating a low reference at the voltage divider 44, which subsequently causes the output of the running comparator 38 to also go low. The selected 70% FLA threshold is somewhat arbitrary, and any value could be used as long as it is less than the reference level into the running comparator 38.

The capacitor 54 remains charged, however, keeping the inhibit signal removed from the protection module 26 until the motor current drops back below the 10% FLA threshold set at the start/stop comparator 30 by the reference generator 32. When the motor current drops below the 10% FLA threshold, the output of the start/stop comparator 30 goes low, the capacitor 54 discharges through the discharge diode 56, and the protection inhibit module 28 returns to the stopped state.

The operation of the protection inhibit module 28 is further described with reference to the state machine diagram shown in FIG. 3 and a graph of motor current depicted in FIG. 4. As shown in FIG. 4, curve 60 represents motor current during a motor start event. The graph is divided into a stopped interval 62, a starting interval 64, and a running interval 66.

Figure 3:
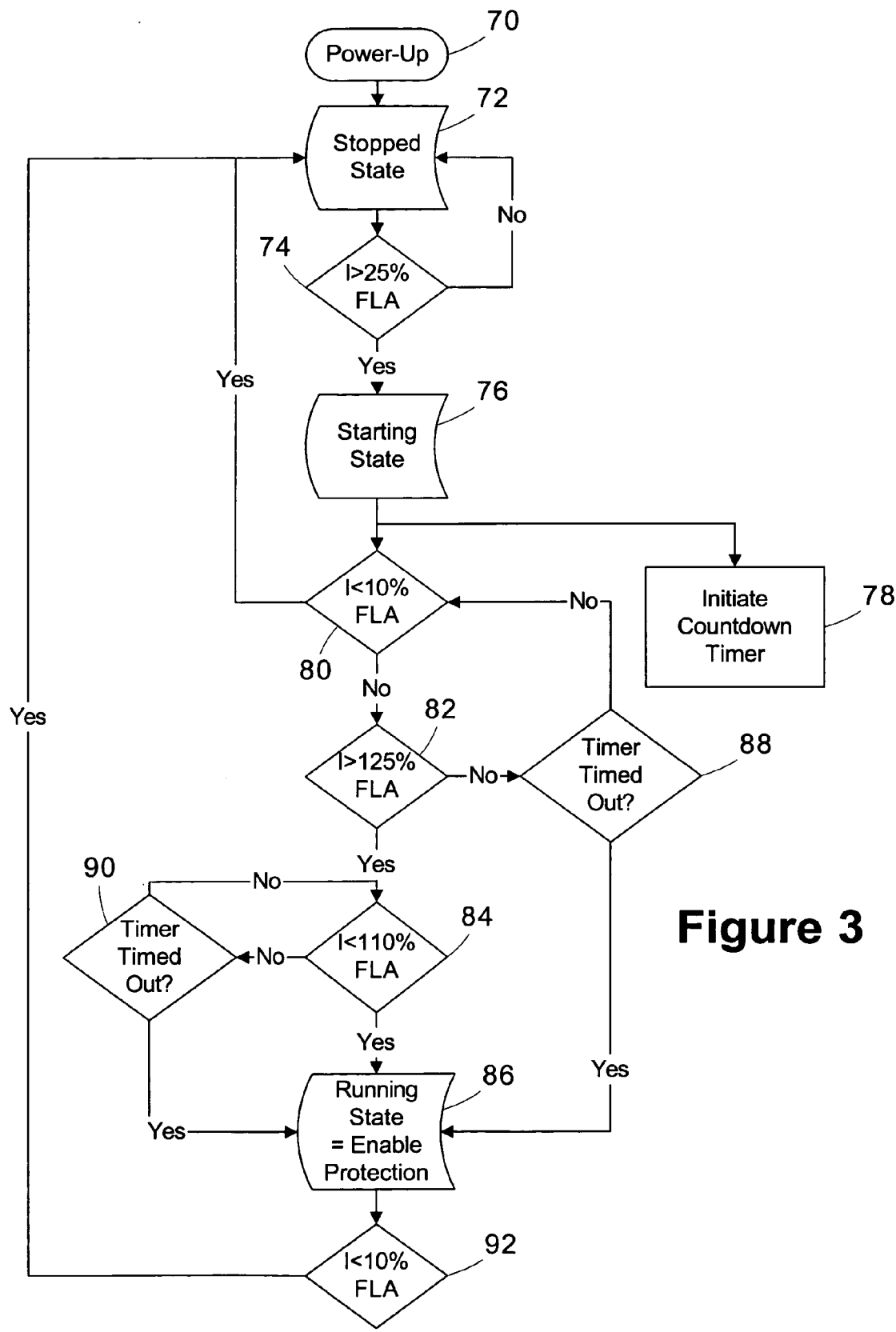
FIG. 3 is a simplified diagram of a state machine implemented by the circuit of FIG. 2.
Figure 4:
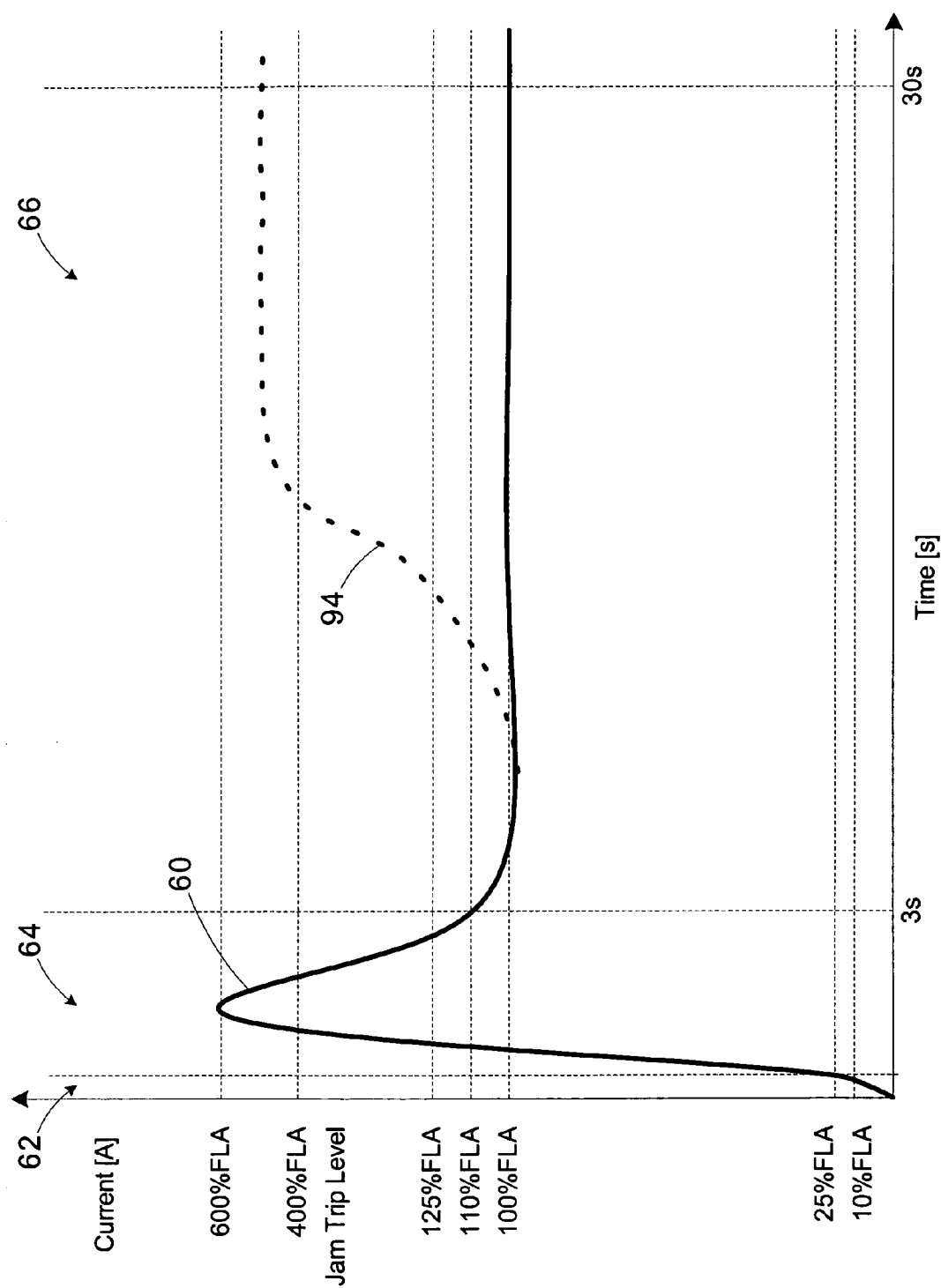
FIG. 4 is a diagram illustrating a motor current profile during startup and operation of a motor in the motor control system of FIG. 1.

Referring to FIG. 3, block 70 represents the powering up of the protection inhibit module 28. The protection inhibit module 28 is initially placed in a stopped state 72, represented by the stopped interval 62 of FIG. 4. When the 25% FLA starting threshold is detected on block 74, the protection inhibit module 28 transitions to a starting state 76, represented by the starting interval 64 of FIG. 4, and a starting state countdown timer is started in block 78. If the motor current drops below 10% FLA in block 80, the protection inhibit module 28 returns to the stopped state 72.

If the motor current exceeds a 125% FLA threshold in block 82, and then drops back down below a 110% FLA threshold in block 84, the protection inhibit module 28 enters a running state 86 and enables the protection module 26, represented by the running interval 66 of FIG. 4. Although the blocks 80 and 82 are shown as being sequential, they may actually operate in parallel. If the current drops down below 10% FLA at any time, the protection inhibit module 28 returns to the stopped state 72.

If the timer expires in block 88 prior to the 125% FLA threshold being detected in block 82, the protection inhibit module 28 transitions to the running state 86. Likewise, if the timer elapses in block 90 prior to detecting the return below the 110% threshold in block 84, the protection inhibit module 28 transitions to the running state 86. The protection inhibit module 28 remains in the running state until the motor current drops below the 10% FLA threshold in block 92.

Within the context of the circuit diagram of FIG. 2, the start/stop comparator 30 and reference generator 32 implement the start/stop logic defined by blocks 74, 80, and 92. The inrush comparator 34 and the reference generator 36 implement the inrush logic of block 82. The voltage divider 44 and the running comparator 38 implement the running logic of block 84. The inhibit comparator 40 and reference generator 42 implement the running state 86 and remove the inhibit signal from the protection module 26. The delay circuit 50 implements the timer logic represented by blocks 78, 88, and 90.

Although the reference generator 32 and reference generator 36 allow the start/stop comparator 30 and inrush comparator 34 to implement multiple comparisons for determining the states of the protection inhibit module 28, it is contemplated that a different arrangement, e.g., using more individual comparators may also be used. Furthermore, the particular thresholds and time intervals used by the protection inhibit module 28 may vary depending on the particular application and factors such as the operating characteristics of the motor 18 and the nature of the load 20.

Referring to FIG. 4, the operation of the protection inhibit module 28 is described during a jam event that occurs shortly after the motor 18 is started. Curve 94 represents the motor current seen if the motor is jammed. The threshold of the protection module 26 for tripping the motor is set at 400% FLA. As seen in FIG. 4, the running state 86 of FIG. 3 is entered after about 3 seconds, when the running comparator 38 sees the motor current drop back below 110% FLA and charges the capacitor 54 through the charging diode 58. Hence, at 3 seconds, the inhibit comparator 40 removes the inhibit signal, thereby activating the protection module 26. Shortly after the protection module 26 is enabled, the motor 18 jams, and the current begins to rise, as indicated by the curve 94. The protection module 26 triggers when the motor current exceeds its 400% FLA threshold and sends a signal to the overload relay 24 to open the controller 14. If the protection module 26 had not been enabled until the timer provided by the delay circuit 50 elapsed at 30 seconds, the high level of current would have been present for a much longer time period before the protection module 26 would have been enabled and detected the jam.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A circuit for inhibiting a protection device of a motor, comprising:
   a first comparator operable to determine if a motor current signal associated with the motor exceeds a starting threshold to identify a starting state of the motor;
   a second comparator operable to determine if the motor current signal exceeds an inrush threshold to identify a transition from the starting state to an inrush state of the motor;
   a third comparator operable to determine if the motor current signal falls below a running threshold to identify a transition from the inrush state to a running state of the motor; and
   an inhibit signal generator operable to deassert an inhibit signal for inhibiting the protection device responsive to the third comparator identifying the running state.

2. The circuit of claim 1, wherein the inhibit signal generator is operable to assert the inhibit signal responsive to the third comparator not identifying the running state.

3. The circuit of claim 1, further comprising a delay circuit operable to trigger the inhibit signal generator to deassert the inhibit signal responsive to a predetermined time interval elapsing.

4. The circuit of claim 3, wherein the delay circuit includes a resistor and a capacitor, and the first comparator is operable to assert a starting output signal for charging the capacitor through the resistor responsive to identifying the starting state.

5. The circuit of claim 3, wherein the third comparator is operable to assert a running output signal for charging the delay circuit to bypass the predetermined time interval responsive to identifying the running state.

6. The circuit of claim 5, further comprising a charging diode coupled between the third comparator running signal and the delay circuit.

7. The circuit of claim 1, further comprising a first reference generator operable to generate a starting reference signal corresponding to the starting threshold, wherein the first comparator is operable to compare the motor current signal to the starting reference signal to identify the starting state.

8. The circuit of claim 7, wherein the first comparator is operable to assert a starting output signal responsive to identifying the starting state, the first reference generator is operable to generate a stopping reference signal responsive to the starting output signal being asserted, and the first comparator is further operable to compare the motor current signal to the stopping reference signal and deassert the starting output signal responsive to the motor current signal falling below the stopping reference signal.

9. The circuit of claim 1, wherein the second comparator is operable to assert an inrush output signal responsive to identifying the inrush state, and the circuit further comprises a voltage divider operable to receive the inrush output signal and scale the inrush output signal to provide a running reference signal corresponding to the running threshold to the third comparator.

10. The circuit of claim 7, further comprising a second reference generator operable to generate an inrush reference signal corresponding to the inrush threshold, wherein the second comparator is operable to compare the motor current signal to the inrush reference signal to identify the inrush state.

11. The circuit of claim 10, wherein the second comparator is operable to assert an inrush output signal responsive to identifying the inrush state, the second reference generator is operable to generate a reset reference signal responsive to the inrush output signal being asserted, and the second comparator is further operable to compare the motor current signal to the reset reference signal and deassert the inrush output signal responsive to the motor current signal falling below the reset reference signal.

12. The circuit of claim 1, wherein the inhibit signal generator comprises a fourth comparator operable to compare a running input signal to a running reference signal and deassert the inhibit signal responsive to the running input signal exceeding the running reference signal.

13. The circuit of claim 1, wherein the third comparator is operable to generate the running input signal having a value greater than the running reference signal responsive to identifying the running state.

14. The circuit of claim 13, further comprising a delay circuit operable to generate the running input signal having a value greater than the running reference signal responsive to a predetermined time interval elapsing.

15. The circuit of claim 14, wherein the third comparator is operable to charge the delay circuit responsive to identifying the running state, causing the running input signal to exceed the running reference signal.

16. A circuit for inhibiting a protection device of a motor, comprising:

a starting comparator operable to compare a motor current signal associated with the motor to a starting threshold and assert a starting output signal responsive to the motor current signal exceeding the starting threshold;

an inrush comparator operable to compare the motor current signal to an inrush threshold and assert an inrush output signal responsive to the motor current signal exceeding the inrush threshold after exceeding the starting threshold;

a running comparator operable to compare the motor current signal to a running threshold and assert a running output signal responsive to the motor current signal falling below the running threshold after exceeding the inrush threshold; and an inhibit signal generator operable to deassert an inhibit signal for inhibiting the protection device responsive to the assertion of the running output signal.

17. The circuit of claim 16, further comprising a delay circuit operable to receive the starting output signal and assert the running output signal responsive to a predetermined time interval elapsing.

18. The circuit of claim 16, further comprising a voltage divider coupled to receive the inrush output signal and scale the inrush output signal to generate the running threshold.

19. A motor control system, comprising:

a motor operable to rotate responsive to a motor drive signal;

a controller operable to provide the motor drive signal to the motor;

a protection device operable to monitor a motor current signal associated with the motor to perform a protective function for the motor; and an inhibit circuit, comprising:

a starting comparator operable to compare the motor current signal to a starting threshold and assert a starting output signal responsive to the motor current signal exceeding the starting threshold;

an inrush comparator operable to compare the motor current signal to an inrush threshold and assert an inrush output signal responsive to the motor current signal exceeding the inrush threshold after exceeding the starting threshold;

a running comparator operable to compare the motor current signal to a running threshold and assert a running output signal responsive to the motor current signal falling below the running threshold after exceeding the inrush threshold; and an inhibit signal generator operable to deassert an inhibit signal for inhibiting the protection device responsive to the assertion of the running output signal.

* * * * *